UNITED STATES PATENT OFFICE.

THOMAS McCONNELL, OF HAWERA, NEW ZEALAND, ASSIGNOR TO WILLIAM DAWSON MURRAY, OF HAWERA, NEW ZEALAND.

PAINT COMPOSITION.

1,238,797. Specification of Letters Patent. Patented Sept. 4, 1917.

No Drawing. Application filed September 15, 1915. Serial No. 50,874.

*To all whom it may concern:*

Be it known that I, THOMAS McCONNELL, subject of the King of Great Britain, residing at Hawera, New Zealand, have invented new and useful Improvements in Paint Compositions; and I do hereby declare the following to be a full, clear, and exact description of the same.

This invention relates to improvements in painting compositions that have been devised for the purpose of producing a paint useful for all purposes but particularly for rust and damp resisting. The composition is particularly adapted for coating ships' hulls, iron roofs and metal surfaces generally, but is capable of use upon asbestos sheeting and wood. The composition produces a hard fast surface that will not rub or chalk and which possesses fire resisting properties.

The invention consists in the combination with an ordinary paint body material, such as red lead, and oil of a proportion of animal blood well mixed with such base. For instance, a suitable composition may be made up of red lead, boiled oil and blood, the relative proportions of which will vary for the different purposes to which the paint is to be put. A suitable proportion useful for treating iron roofs and walls consists in 2 pounds of red lead, 2¼ pints of boiled oil and 5½ pints of blood, while for use on ships' hulls the mixture most suitable is 2 pounds red lead, 2 pints of boiled oil and 5 pints of blood.

The approved manner of mixing consists in first mixing a small portion of the oil with the oxid until the mass is thickened, then heating the mixture and adding thereto, mixtures of the remainder of the oil and the blood, while maintaining the heat. These mixtures of the oil and blood will vary in the relative proportions of the blood to the oil, the blood increasing in proportion to the oil with each successive mixture added to the whole. These mixtures are added slowly to the whole and are thoroughly stirred into it.

Paint of any desired color may be produced by the employment of suitable bases and coloring ingredients, and the paint when prepared, may be stored in cans or drums in the usual way.

I claim:—

A paint composition comprising 2 pounds of paint body material; 2 to 2½ pints of boiled oil, and 5 to 5½ pints of blood.

In testimony whereof I have signed this specification in the presence of two subscribing witnesses.

THOMAS McCONNELL.

Witnesses:
WILLIAM PATRICK O'CONNOR,
VIOLET O'CONNOR.